Dec. 26, 1950 — E. FRANK ET AL — 2,535,912
VIDEO GATING CIRCUIT
Filed Dec. 8, 1948
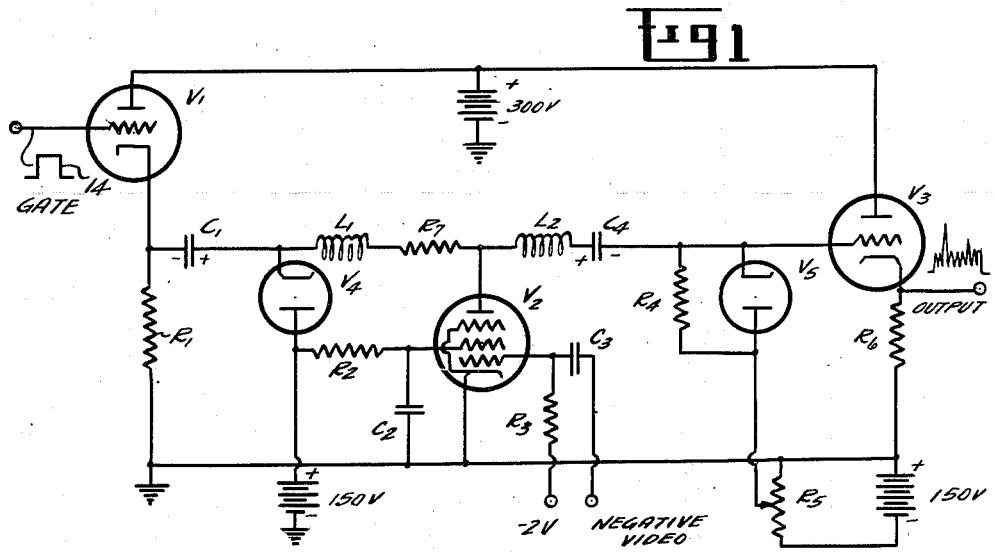
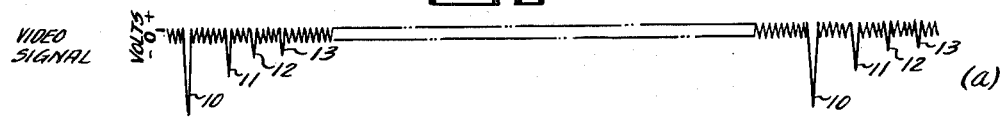
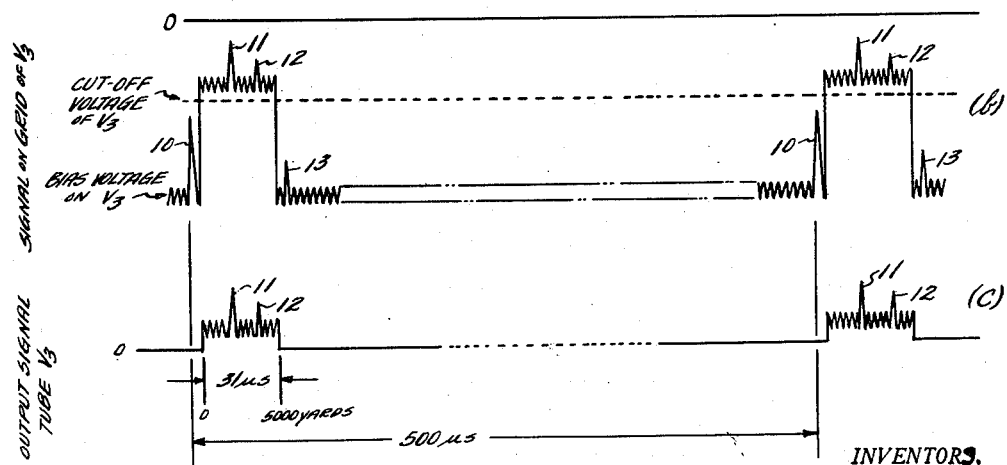
INVENTORS.
ERNEST FRANK
ROBERT F. MOZLEY
BY Wade Koonty
ATTORNEY and
James S. Shannon
AGENT Patented Dec. 26, 1950

2,535,912

UNITED STATES PATENT OFFICE 2,535,912

VIDEO GATING CIRCUIT

Ernest Frank, Yeadon, Pa., and Robert Fred Mozley, Berkeley, Calif., assignors to the United States of America as represented by the Secretary of the United States Air Force Application December 8, 1948, Serial No. 64,136

4 Claims. (Cl. 250—27)

This invention relates to gated viedo frequency amplifiers particularly as used in radar systems.

In radar systems of the type in which short pulses of high frequency energy are radiated and the time intervals between the radiated pulses and reflected pulses from outlying targets are measured to determine the target ranges it is frequently desirable to limit the target presentation on the screen of the cathode ray indicator tube to those targets lying within a given range. By so doing the resulting presentation contains only the targets of interest and is considerably improved by the elimination of other target reflections and a great amount of noise and background clutter. Automatic gun laying systems for use in military aircraft usually employ such limitation thus restricting the display to only those targets within the usable range of the guns, say 5000 yards.

The above described limitation is usually accomplished by rendering the video amplifier which applies the received signals to the cathode-ray indicator tube operative for a period of time after each radiated pulse just sufficient to allow reflections from targets up to 5000 yards, or other selected distance, to be received. After this time interval the video amplifier becomes inoperative to apply signals to the indicator tube until the occurrence of another radiated pulse. For targets up to 5000 yards this time interval is approximately 31 microseconds which is a small fraction of the time interval between radiated pulses which, for a 2000 pulse per second repetition rate, is 500 microseconds. In order to render the video amplifier operative for the desired interval a rectangular gating pulse is generated, the leading edge of which is coincident with the trailing edge of the radiated pulse and the duration of which is made equal to the time required for an electromagnetic wave to travel to and return from a target at the maximum range desired. In the case of a 5000 yard maximum range the gating pulse would have a duration of approximately 31 microseconds as stated above.

It is the object of this invention to provide an improved gated amplifier such as could be used in the above described application or in any application requiring a high frequency amplifier which may be rendered operative for short and precise intervals of time. The amplifier has minimum requirements as to the amplitude of the gating pulse due to the fact that a direct voltage in addition to the gating voltage is applied to the anode of the gated tube. Provisions are also made for either preventing the appearance of the gate as a pedestal in the output signal of the amplifier or for allowing a pedestal of adjustable height to appear, as desired.

The details of a specific embodiment of the invention are shown in the accompanying drawing in which Fig. 1 is a schematic diagram of the gated video amplifier and Fig. 2 shows several waveforms appearing in the circuit of Fig. 1.

Referring to Fig. 1 the video amplifier comprises two amplifier tubes, $V_2$ and $V_3$, connected in cascade. The negative video signal from the radar receiving equipment is applied to the control grid of tube $V_2$ through condenser $C_3$. This signal may be of the form shown in Fig. 2(a) in which 10 represents the radiated pulse and 11, 12 and 13 represent reflections from targets. The time interval between radiated pulses is shown in this figure to be 500 microseconds which corresponds to a pulse repetition rate of 2000 per second. This signal is amplified and reversed in phase by tube $V_2$ and applied as a positive signal to the grid of tube $V_3$. Since $V_3$ is connected as a cathode follower the output signal taken from across load resistor $R_6$ is likewise a positive signal.

In order to gate the above described video amplifier the gating pulse 14 in Fig. 1 is applied to the grid of tube $V_1$ which is connected as a cathode follower and has a load impedance $R_1$. This cathode follower stage acts as an impedance changing device so that the resulting positive gate developed across resistor $R_1$ appears to come from a source of very low internal impedance. A low output impedance is one of the well known characteristics of a cathode follower stage and is due to negative feedback of the entire output voltage. The gating pulse may be generated in any desired way and applied at any time as required by the use to which the amplifier is to be put. In the above described radar application the gating pulse, as already mentioned, begins at the end of the radiated pulse and, in the case of a 5000 yard maximum range, has a length of 31 microseconds. However, apparatus for generating and timing the gating pulse is not a part of this invention. The tube $V_2$ is provided with a load impedance consisting of resistance $R_7$ and inductance $L_1$. The low signal potential end of inductance $L_1$ is connected through condenser $C_1$ to the cathode of $V_1$ and through diode $V_4$ to a source of direct potential of +150 volts. The output signal from amplifier $V_2$ is applied through inductance $L_2$ and blocking condenser $C_4$ to the grid of cathode follower stage $V_3$. The grid of $V_3$ is connected to an adjustable contact on potentiometer $R_5$ through high resistance $R_4$ whereby an adjustable negative bias potential is applied thereto. The diode $V_5$ shunts resistor $R_4$ and prevents the grid from ever becoming more negative than the adjustable tap on $R_5$. A diode used in this manner is sometimes referred to as a clamping device since its clamps the applied wave to the potential of the tap on $R_5$.

In the absence of a gating pulse on the grid of $V_1$ current flows from the +150 volt source through $L_1$, $R_7$ and the anode-cathode path of $V_2$ to ground thus placing a positive potential on the plate of $V_2$ somewhat less than +150 volts depending upon the drop across $R_7$. Also current flows around the circuit consisting of the +150 volt source, diode $V_4$, condenser $C_1$ and resistor $R_1$ until condenser $C_1$ is charged to a voltage equal to 150 volts minus the drop across $V_4$ and the normal steady state voltage across $R_1$ due to the space current of $V_1$. Since $V_4$ has low internal resistance and $R_1$ has a low value of 5000 to 10,000 ohms, which appears still lower due to the feedback action in the associated cathode follower stage, the time constant of the charging circuit for $C_1$ is short and this condenser charges very rapidly.

Due to the fact that a positive potential exists on the anode of tube $V_2$ in the absence of a gating pulse, as explained above, the tube acts during this time to amplify and reverse the phase of the video signal applied to its grid. The resulting positive video signal on the anode of $V_2$ is applied to the grid of $V_3$; however no signal appears at the output of $V_3$ due to the fact that this tube is biased beyond its cut-off point, by the voltage from $R_5$, by an amount greater than the voltage of the maximum video signal applied to its grid so that the video signal, in the absence of a gate, is unable to cause conduction in $V_3$. This condition is shown graphically in Fig. 2(b).

The application of a positive gating pulse to the grid of $V_1$ causes a pulse of substantially the same amplitude to appear across resistor $R_1$. This voltage, acting through condenser $C_1$ and impedance $L_1$—$R_7$, raises the potential of the anode of $V_2$ by an amount equal to the pulse voltage. Since the action of the gating pulse also raises the potential of the cathode of $V_4$ above that of the anode this diode becomes non-conductive thus isolating tube $V_2$ from the +150 volt supply during the gating pulse. Therefore, operating potential for the anode of tube $V_2$ in the presence of the gate comes from the voltages across $R_1$ and $C_1$ connected in series. Condenser $C_1$ should be large enough to hold its charge and voltage substantially at full value during the gating pulse. The size of $C_1$ therefore depends on the resistance in its discharge circuit which includes $R_1$, $R_7$ and the plate resistance of $V_2$. In a circuit of the type shown a capacity of 0.25 microfarad for $C_1$ is ample for gating pulses up to 122 microseconds, which corresponds to a range of 20,000 yards. In order to have the anode potential of $V_2$ follow the gating pulse closely the time constants of the anode circuit should be small. This will be realized in the circuit shown because of the comparatively low value of $R_7$, which may be of the order of 10,000 ohms, and the very small capacity between the anode of $V_2$ and ground.

During the absence of a gating pulse and with the circuit of Fig. 1 in a stable condition the condenser $C_4$ will be charged to a voltage equal to the sum of the anode voltage $V_2$ and the voltage of the tap on $R_5$, with the polarity of the condenser voltage as indicated in the figure. In the presence of a gating pulse the anode voltage of $V_5$ is elevated to a higher level during which time condenser $C_4$ charges to a higher level; however the increase in charge will be very slight due to the large time constant of $C_4$ and $R_4$ which, with $C_4$ of the order of 0.02 microfarad and $R_4$ of the order of 1 megohm, will be of the order of .02 second or 20,000 microseconds, and to the fact that the gating pulse lasts at the most for only 122 microseconds, and for 5000 yards range for only 31 microseconds. The gate pedestal appearing on the anode of tube $V_2$ is therefore for all practical purposes transferred directly to the grid of tube $V_3$. At the end of the gating pulse the anode potential drops to its original value and condenser $C_4$ discharges to its original voltage. However the discharge current passes through the low resistance afforded by diode $V_5$ rather than through high resistance $R_4$ thus preventing any lowering of the grid potential of $V_3$ below the value set by the position of the tap on $R_5$. Tube $V_5$ therefore in effect restores the direct component of the rectangular wave on the anode of $V_2$ which could not be transmitted through condenser $C_4$.

Since video signal is continuously applied to the control grid of $V_2$ a resulting video signal will appear in the output circuit of this tube along the crest of the pedestal formed by the gating pulse. This combined pedestal and video signal and its relation to the bias and cut-off voltages of $V_3$ are shown in Fig. 2 (b). By providing a bias potential from $R_5$ of such value that the pedestal just exceeds the cut-off point of $V_3$ a slight pedestal carrying the video signal occurring during the gate appears in the output of $V_3$ as shown in Fig. 2 (c). If desired, the negative bias may be increased to the point where the pedestal just reaches the cut-off point in which case the video signal without the pedestal appears in the output circuit.

The inductances $L_1$ and $L_2$ in Fig. 1 may be of the order of 100 and 400 microhenries respectively and help to preserve the square wave form of the gate and resulting pedestal.

We claim as our invention:

1. A gated amplifier comprising a first amplifier tube and a second amplifier tube each having an anode, a cathode and a control grid, means for applying a signal to be amplified between the control grid and cathode of said first tube, means for applying a positive direct potential between the anode and cathode of said first tube, means for applying a positive rectangular gating pulse to the anode of said first tube, means for applying the gating pulse and amplified signal on the anode of said first tube to the grid of said second tube, a source of operating potential and a load impedance connected between the anode and cathode of said second tube, means for connecting an output circuit across said load impedance, and means independent of the signal on the grid of said second tube for biasing the grid of said second tube neagtive with respect to the cathode of said second tube by a fixed amount equal to the cut-off voltage of said tube plus a voltage greater than the maximum signal applied to said grid in the absence of a gating pulse and equal to or less than the amplitude of the gating pulse applied to said grid from the anode of said first tube.

2. A gated amplifier comprising a first amplifier tube having an anode, a cathode and a control grid, means connecting the cathode of said first tube to a point of reference potential, a load impedance having one end connected to the anode of said first tube and the other end connected to the cathode of a diode rectifier tube, a source of direct current having its positive terminal connected to the anode of said diode and its negative terminal connected to said point of reference potential, a condenser having one terminal connected to the cathode of said diode, means having a low internal impedance for applying a positive rectangular gating pulse between the other side of said condenser and said point of reference potential, said condenser being of sufficient capacity that the time constant of the circuit including said condenser, said load impedance, the plate impedance of said first tube and the internal impedance of said pulse applying means is long compared to the duration of said gating pulse, means for applying a signal to be amplified between the grid and cathode of said first tube, a second amplifier tube having an anode, a cathode and a control grid, means connecting the anode of said second tube to the positive terminal of a source of direct current the negative terminal of which is connected to said point of reference potential, means connecting the cathode of said second tube through a load impedance to said point of reference potential, coupling means including a blocking condenser connected between the anode of said first tube and the grid of said second tube whereby the gating pulse and signal appearing on the anode of said first tube are applied to the grid of said second tube, means including a high resistance connected between the grid of said second tube and a point having a negative potential with respect to said reference point said negative potental having a value equal to the cut-off voltage of said second tube plus a voltage greater than the maximum signal applied to the grid of said second tube in the absence of a gating pulse and equal to or less than the amplitude of the gating pulse applied to said grid from the anode of said first tube.

3. Apparatus as claimed in claim 2 in which said rectangular gating pulse applying means is a cathode follower stage.

4. Apparatus as claimed in claim 3 in which a diode is connected in shunt to the high resistance connected between the grid of said second tube and said point of negative potential and in which said last named diode is poled to conduct toward said grid.

ERNEST FRANK.
ROBERT FRED MOZLEY.

REFERENCES CITED

The following references are of record in the file of this patent:

UNITED STATES PATENTS

| Number | Name | Date |
| --- | --- | --- |
| 1,912,234 | Willoughby | May 30, 1933 |
| 2,132,655 | Smith | Oct. 11, 1938 |